United States Patent
Krolak et al.

(10) Patent No.: US 9,991,778 B2
(45) Date of Patent: Jun. 5, 2018

(54) BALANCING CURRENT WITHIN A MODULAR CONVERTER SYSTEM

(71) Applicant: THE BOEING COMPANY, Chicago, IL (US)

(72) Inventors: Matthew J. Krolak, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days. days.

(21) Appl. No.: 15/055,828

(22) Filed: Feb. 29, 2016

(65) Prior Publication Data

US 2017/0250622 A1    Aug. 31, 2017

(51) Int. Cl.
| | | |
|---|---|---|
| H02M 1/088 | (2006.01) | |
| H02J 1/14 | (2006.01) | |
| H02M 7/493 | (2007.01) | |
| H02M 7/537 | (2006.01) | |

(52) U.S. Cl.
CPC .............. *H02M 1/088* (2013.01); *H02J 1/14* (2013.01); *H02M 7/493* (2013.01); *H02M 7/537* (2013.01)

(58) Field of Classification Search
CPC ........... H02M 7/17; H02M 2007/4822; H02M 3/155; H02M 3/156; H02M 3/157; H02M 3/158; H02M 3/1584; H02M 3/1588; H02M 2003/155; H02M 2003/156; H02M 2003/158; H02M 2003/1584
USPC ............. 363/71, 73, 79, 95, 142, 40; 307/31
See application file for complete search history.

(56) References Cited

U.S. PATENT DOCUMENTS

| | | | | |
|---|---|---|---|---|
| 5,852,554 A | * | 12/1998 | Yamamoto | ............ H02M 7/493 363/65 |
| 5,991,173 A | | 11/1999 | Nishikawa | |
| 6,940,736 B2 | * | 9/2005 | Jonsson | ............. H02M 3/1584 363/71 |
| 8,345,454 B1 | * | 1/2013 | Krolak | .................... H02M 7/42 307/31 |

(Continued)

FOREIGN PATENT DOCUMENTS

| | | |
|---|---|---|
| EP | 0409226 A2 | 1/1991 |
| EP | 2763260 A2 | 8/2014 |

(Continued)

OTHER PUBLICATIONS

International Business Machines, U.S. Appl. No. 14/502,350, filed Sep. 30, 2014, entitled "Parallel Modular Converter Architecture," 33 pages.

(Continued)

*Primary Examiner* — Kyle J Moody
(74) *Attorney, Agent, or Firm* — Patterson + Sheridan, LLP

(57) ABSTRACT

To provide current balancing between paralleled first and second inverter units of a modular converter system, a system controller is configured to determine a gate driver offset value based on respective voltages at the phase output nodes of the first and second inverter units. The system controller controls gate drivers for the first and second inverter units based on the determined gate driver offset value. In turn, the gate drivers drive the first and second inverter units with subsequent drive signals such that the amounts of current provided by the first and second inverter units when producing an in-phase power output are balanced.

20 Claims, 8 Drawing Sheets

(56) References Cited

U.S. PATENT DOCUMENTS

| | | | |
|---|---|---|---|
| 8,907,642 B1* | 12/2014 | Burstein | H02M 3/1584 323/272 |
| 2004/0138786 A1 | 7/2004 | Blackett et al. | |
| 2004/0262057 A1 | 12/2004 | Kumar | |
| 2007/0259545 A1 | 11/2007 | Berenger | |
| 2007/0295545 A1 | 12/2007 | Romig et al. | |
| 2008/0073135 A1 | 3/2008 | Oyobe et al. | |
| 2008/0100136 A1 | 5/2008 | Langlois et al. | |
| 2008/0111421 A1 | 5/2008 | Anghel et al. | |
| 2009/0033252 A1 | 2/2009 | Smith et al. | |
| 2009/0156068 A1 | 6/2009 | Barrett et al. | |
| 2010/0013419 A1 | 1/2010 | White | |
| 2011/0149616 A1* | 6/2011 | Svardsjo | H02M 3/33592 363/24 |
| 2011/0156623 A1 | 6/2011 | Nakamura et al. | |
| 2012/0013284 A1 | 1/2012 | Campbell | |
| 2013/0343105 A1 | 12/2013 | Kosugi | |
| 2014/0204643 A1* | 7/2014 | Wagoner | H02M 7/5387 363/132 |
| 2014/0233289 A1 | 8/2014 | Zhao et al. | |
| 2016/0043651 A1* | 2/2016 | Fulcher | H02M 7/04 290/44 |
| 2016/0094030 A1 | 3/2016 | Gao et al. | |
| 2016/0094039 A1 | 3/2016 | Winstanley et al. | |
| 2016/0094040 A1 | 3/2016 | Krolak et al. | |
| 2016/0118899 A1* | 4/2016 | Goeke | H02M 3/33507 363/21.01 |
| 2016/0156291 A1* | 6/2016 | Becker | H02M 7/68 318/400.26 |
| 2016/0204726 A1 | 7/2016 | Mori et al. | |
| 2016/0261205 A1 | 9/2016 | Kolar et al. | |

FOREIGN PATENT DOCUMENTS

| | | |
|---|---|---|
| JP | 04325893 A | 11/1992 |
| WO | 2014025734 A2 | 2/2014 |

OTHER PUBLICATIONS

He et al., "Synchronization Control Strategy of Multi-motor System Based on Profibus Network," Automation and Logistics, 2007 IEEE International Conference, Aug. 2007, pp. 3029-3034.

Extended Eurpoean Search Report for application No. 17157979.0-1809 dated Jul. 4, 2017.

* cited by examiner

BALANCING CURRENT WITHIN A MODULAR CONVERTER SYSTEM

CROSS-REFERENCE TO RELATED APPLICATION

This application is related to the following published patent application: number 2016/0094039 entitled "Parallel Modular Converter Architecture".

FIELD

The present disclosure relates generally to power management, and more specifically, to balancing current between parallel inverters within a modular converter architecture.

BACKGROUND

Modern vehicles use a large number of electronics, motors, heaters, and other electrically-driven equipment. Electric motors, in particular, are ubiquitous in modern vehicles, including aircraft, and drive everything from hydraulic pumps to cabin fans. Conventionally, each of these electric motors is driven by an independent motor controller. Each motor controller is sized to be able to carry the maximum amount of current required to power its respective motor at full power for an extended period of time (and generally, further includes some additional capacity for safety) without overheating or malfunctioning.

As a result, each aircraft carries a number of motor controllers, each of which is typically oversized and under-utilized a majority of the time. In other words, the motor controller includes enough capacity to run the motor at full power for an extended period of time plus a safety margin, but motors are rarely, if ever, run at full capacity. This is because the motors themselves have some safety margin built in and because, a majority of the time, the motors are operating in a lower demand regime (e.g., the cabin fan is not always on "High"). In addition, some motors are only used occasionally, or during specific flight segments, and are unused the remainder of the time. As a result, many of an aircraft's complement of heavy, expensive motor controllers spend a majority of their service life either inactive or operating significantly below their rated power outputs.

To better utilize motor controller capacity, a modular converter system can provide multiple, modular, assignable, dynamically reconfigurable motor controllers that can work alone or in parallel with other parallel motor controllers to meet power control needs. The converter system connects one or more controllers, connected in parallel, to each active electrical load in the aircraft, as necessary, to meet existing power demands. Increasing utilization of motor controllers can provide a corresponding reduction in system weight and cost.

During operation the modular converter system, a plurality of paralleled inverters can operate in parallel to power an electric motor or another electrical load. However, the loading of the paralleled inverters can vary due to manufacturing tolerances and variations of the inverters, as well as parasitic elements caused by wiring resistance and inductance and/or other connected components. As a result, driving the paralleled inverters with the same drive signals can result in uneven loading. While the current from each of the paralleled inverters can be balanced using inductors at the outputs, these inductors tend to be unsuitably large and lossy when used within high-power applications.

SUMMARY

One embodiment provides a method of controlling power output of a modular converter system comprising a plurality of parallel inverter units, the plurality of parallel inverter units comprising a first inverter unit with at least a first phase output node and a second inverter unit with at least a second phase output node. The method comprises driving switching elements of the first and second inverter units with initial drive signals to produce an in-phase power output, and determining a gate driver offset value based on respective first and second voltages at the first and second phase output nodes. The method further comprises driving, based on the determined gate driver offset value, the switching elements of the first and second inverter units with subsequent drive signals such that the respective amounts of current provided by the first and second inverter units when producing the in-phase power output are balanced.

Another embodiment provides a modular converter system comprising a system controller and at least first and second inverter units connected in parallel and configured to produce an in-phase power output. Each inverter unit of the first and second inverter units respectively comprises a pair of switching elements having a phase output node coupled therebetween, and a pair of gate drivers, each gate driver configured to receive a respective control signal from the system controller and to generate a drive signal to control switching of a respective one of the pair of switching elements. The system controller is configured to determine a gate driver offset value based on respective voltages at the phase output nodes of the first and second inverter units, and control, based on the determined gate driver offset value, the gate drivers using first and second inverter units with subsequent drive signals such that the amounts of current provided by the first and second inverter units when producing the in-phase power output are balanced.

Another embodiment provides a non-transitory computer-readable medium comprising computer program code that, when executed by operation of one or more computer processors, performs an operation of controlling power output of a modular converter system comprising a plurality of parallel inverter units. The plurality of parallel inverter units comprises a first inverter unit with at least a first phase output node and a second inverter unit with at least a second phase output node. The operation comprises communicating with a plurality of gate drivers to drive switching elements of the first and second inverter units with initial drive signals to produce an in-phase power output, and determining a gate driver offset value based on respective first and second voltages at the first and second phase output nodes. The operation further comprises communicating with the plurality of gate drivers to drive, based on the determined gate driver offset value, the switching elements of the first and second inverter units with subsequent drive signals such that the respective amounts of current provided by the first and second inverter units when producing the in-phase power output are balanced.

The features, functions, and advantages that have been discussed may be achieved independently in various embodiments or may be combined in yet other embodiments, further details of which can be seen with reference to the following description and drawings.

BRIEF DESCRIPTION OF ILLUSTRATIONS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
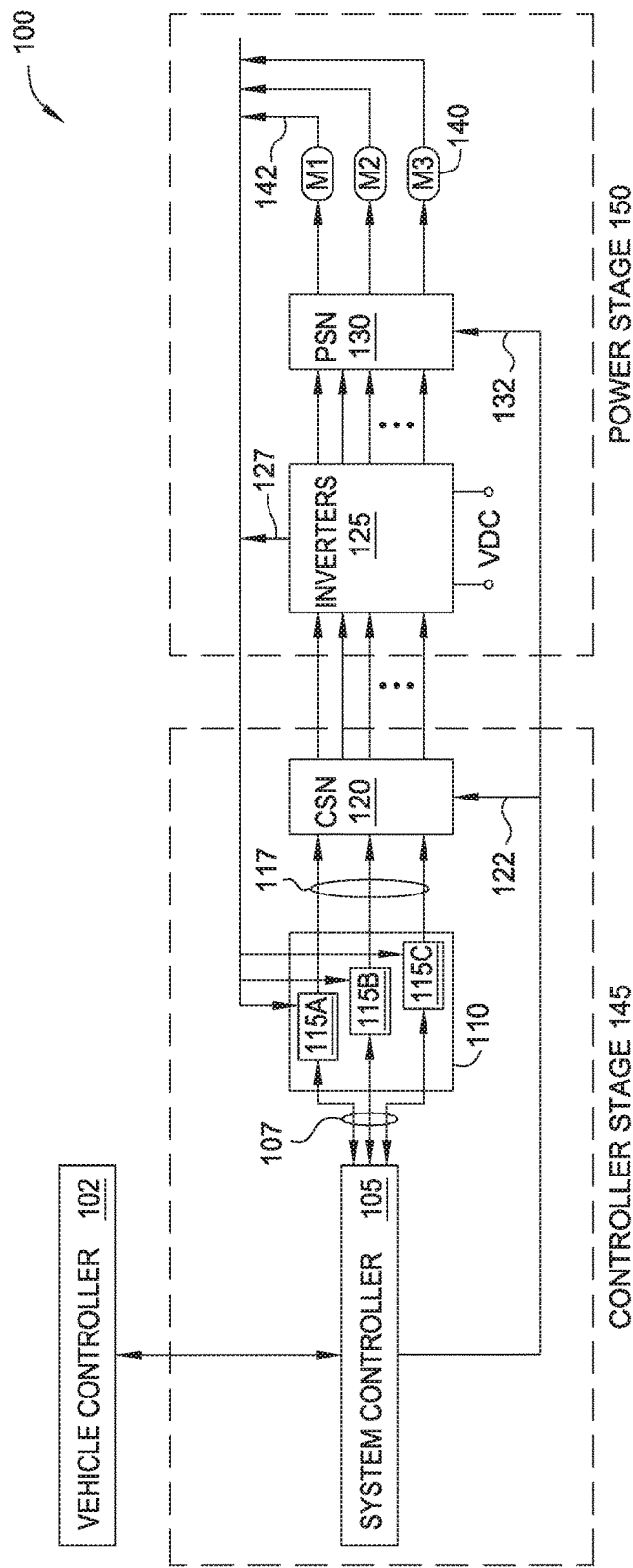
FIG. 1 illustrates a modular converter system, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

To provide current balancing between paralleled first and second inverter units of a modular converter system, a system controller is configured to determine a gate driver offset value based on respective voltages at the phase output nodes of the first and second inverter units. The system controller controls gate drivers for the first and second inverter units based on the determined gate driver offset value. In turn, the gate drivers drive the first and second inverter units with subsequent drive signals such that the amounts of current provided by the first and second inverter units when producing an in-phase power output are balanced.

In some embodiments, the system controller calculates, for each of the first and second inverter units, a respective applied volt-seconds value, and the gate driver offset value is based on a difference between the respective calculated applied volt-seconds values. The calculated applied volt-seconds values may be acquired during a particular switching cycle of the inverter units.

In some embodiments, the modular converter system further comprises one or more integrators coupled with the phase output node of each of the first and second inverter units. Each integrator integrates an output voltage at one of the phase output nodes relative to at least one reference voltage.

Figure 2:
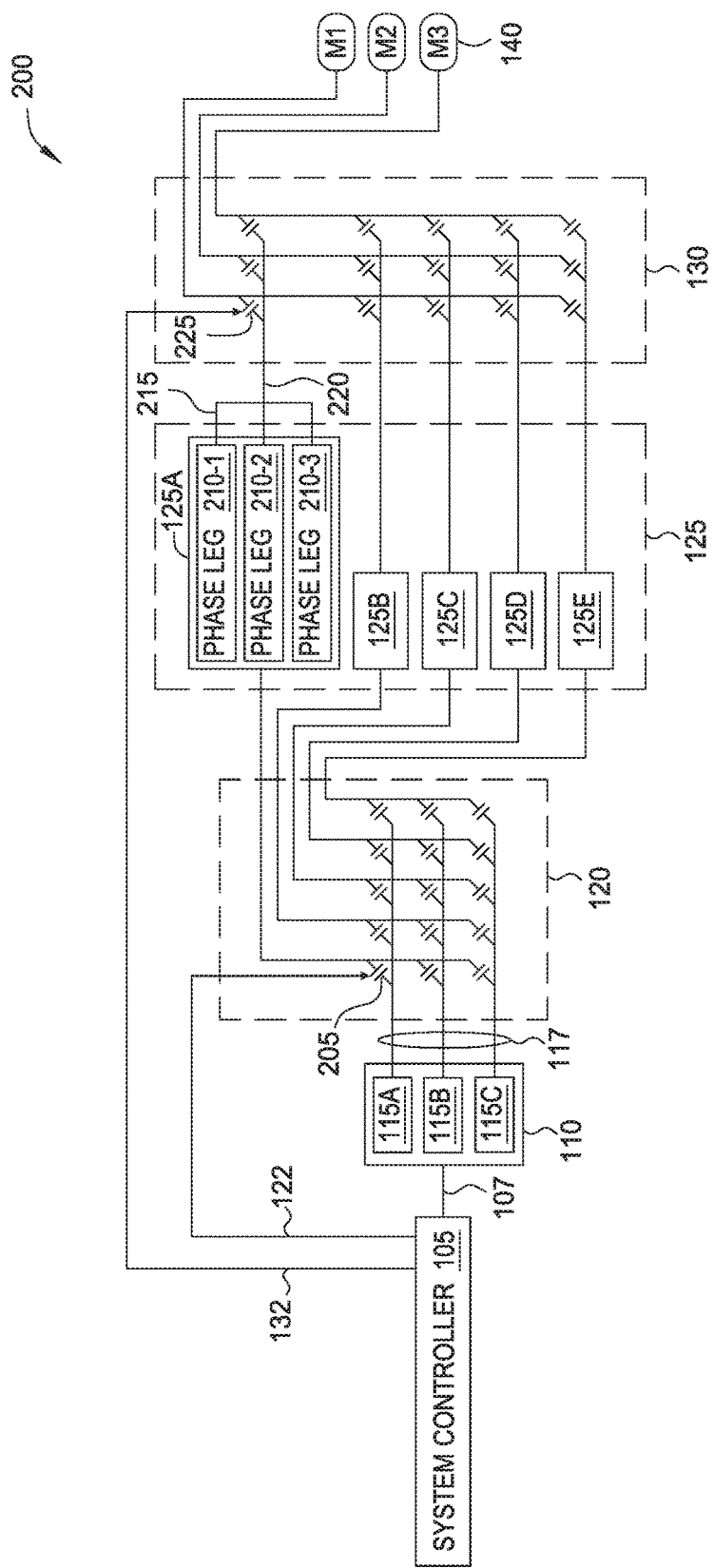
FIG. 2 illustrates a control switching network and a power switching network within a modular converter system, according to one embodiment.

Referring to FIGS. 1 and 2, a modular converter system 100 can control a system of parallel modular inverters 125 (also "inverter modules," "inverter units") to drive multiple and/or different types of AC or DC machines, such as the depicted motors 140 (i.e., motors M1, M2, M3). The modular converter system 100 comprises the plurality of inverters 125 that are connected in parallel, each of which is able to be configured to receive any of a plurality of motor control algorithms 115A, 115B, 115C (also "control algorithms," "algorithms") embedded in a motor control system 110 via a reconfigurable control switching network (CSN) 120. The motor control system 110 may comprise one or more motor controller circuits, each of which is configured to operate one or more motors 140. Each of the parallel modular inverters 125 can be configured to drive one or more of the plurality of electrical loads (e.g., AC or DC machines such as motors 140), on the load side via a reconfigurable power switching network (PSN) 130. In some embodiment, each of the parallel modular inverters 125 provides one phase of output power to the electrical loads. In other embodiments, each of the parallel modular inverters 125 provides multiple phases of output power (e.g., three-phase AC) to the electrical loads. As shown in FIG. 2, the inverter 125A includes three phase legs 210-1, 210-2, 210-3 that are each configured to provide a separate phase output 215 of a three-phase signal 220 to drive selected electrical loads.

This configuration enables, for example, the ability to dynamically reconfigure both the control switching network 120 and power switching network 130. In addition, any of the inverters from the plurality of inverters 125 is accessible to drive any one of the electrical loads (such as motors 140) on the load side, and any control algorithm of a plurality of control algorithms 115A, 115B, 115C embedded in the motor control system 110 is accessible to control any of the plurality of inverters 125. As a result, one or more inverters 125 can drive one motor 140, as necessary to meet load requirements, and/or a plurality of motors 140 on the load side can be driven at the same time, each of which can be driven with one or more inverters 125. In addition, a plurality of motors 140 on the load side can be driven at the same time with the same motor control algorithm (e.g., 115A) or different motor control algorithms (e.g., some with motor control algorithm 115A, some with motor control algorithm 115B).

As shown in FIG. 1, the system 100 comprises a system controller 105 configured to communicate with a vehicle controller 102 to obtain operational commands from the vehicle controller 102 and to provide status signals for modular converter system 100 and/or other information to the vehicle controller 102. In some embodiments, the system controller 105 can also reconfigure the power switching network 130 to provide an appropriate number of inverter modules 125 in parallel to drive a motor 140 in real time. In other words, when the load from a motor 140 is increased, the system controller 105 can signal the power switching network 130 to place more inverters 125 in parallel. Conversely, when motor load is decreased, the system controller 105 can signal the power switching network 130 to disengage one or more inverters 125. If necessary, the system controller 105 can then place them in parallel with other inverters 125 to drive other loads.

In some embodiments, the system controller 105 can also reconfigure the control switching network 120 using CSN control signals 122 to provide appropriate motor control algorithms 115A, 115B, 115C as motor control signals 117 to one or more of the inverters 125 driving one or more motor types. The inverters 125 may further provide feedback signals 127, such as current and/or voltage values, to the motor control system 110 and the selected motor control algorithm 115A, 115B, 115C. Some non-limiting examples of motor control algorithms 115A, 115B, 115C provided by system controller 105 include field-oriented control (FOC), direct torque control (DTC), and voltage over frequency control (V/F). Different motor control algorithms can be useful to efficiently drive the various motor types of the associated vehicle (e.g., induction motors, synchronous motors, permanent magnet (PM) synchronous motors, brushless DC motors, etc.). For example, a typical aircraft can include a starter motor-generator for the main engines (a PM-type motor), a ram-air fan (induction motor), an environmental control system (ECS) compressor motor (PM-type motor), and one or more synchronous motors, all of which may have different power requirements.

In some embodiments, the system controller 105 can also send, for example and not limitation, motor speed, torque, or power reference values to corresponding motors 140 (e.g., via the motor control system 110). In some embodiments, the system controller 105 can be stored and run on an embedded controller. The system controller 105 can comprise, for example and not limitation, a microcontroller, processor, field-programmable gate array (FPGA), or application-specific integrated circuit (ASIC). In some embodiments, the system controller 105 can use a real-time simulator/emulator or can be run in real-time.

In some embodiments, the number of motor controller algorithms 115A, 115B, 115C can be determined by the number of different motor loads. For example, if the system 100 has three different types of motors 140 to drive, then three motor controller algorithms 115A, 115B, 115C can be developed, with each motor control algorithm 115A, 115B, 115C specific to the motor 140. In another example, if all three motors 140 perform the same function, it is possible that all three loads can be powered using a single motor control algorithm 115A, 115B, or 115C.

The control switching network 120 can dynamically configure one or more inverters 125, each of which can be driven by a specific control algorithm 115A, 115B, 115C, or a common control algorithm 115A, 115B, 115C, which is routed through control switching network 120 according to CSN control signals 122 provided by the system controller 105. In some embodiments, a time delay between signals into and out of control switching network 120 can be minimized to improve motor drive performance.

The control switching network 120 can have a software-based or hardware-based implementation. In some embodiments, a software-coded control switching network 120 can be run on, for example and not limitation, an embedded controller, real-time simulator, or computer. In other embodiments, the control switching network 120 can be implemented using a hardware device such as, for example and not limitation, complex programmable logic devices (CPLDs), ASICs, or FPGAs. As shown in FIG. 2, each control switch 205 (whether software or hardware-based) of the control switching network 120 is controlled by the CSN control signals 122 to connect selected control algorithms 115 with selected inverter(s) 125.

In some embodiments, the power switching network 130 can be dynamically configured, using PSN control signals 132 from the system controller 105, to connect one or more inverters 125 to drive one or more motors 140 per one or more specific control algorithms 115A, 115B, 115C from the motor control system 110. In some embodiments, the power switching network 130 can act as a short circuit and/or over-current protection device. In this case, power switch(es) 130 that are associated with the short circuited or over-current load open when a fault is detected.

The power switching network 130 can be implemented using power switches 225, some non-limiting examples of which including solid state relays, mechanical relays, transistors, and other controllable power switches. The system controller 105 controls each power switch 225 using control signals 132. The inverters 125 convert DC power (i.e., VDC in FIG. 1) to the requested AC power output (e.g., with different voltage levels, frequencies, waveforms, etc.) to drive various AC machines (e.g., motors 140) per the selected motor algorithm 115A, 115B, 115C and system controller 105. The inverters 125 can comprise, for example and not limitation, insulated-gate bipolar transistors (IGBTs), metal-oxide-semiconductor field-effect transistors (MOSFETs), and bipolar junction transistors (BJTs).

As shown in FIG. 2, the control switching network 120 includes sufficient numbers of control switches 205 so that each motor control algorithm 115A, 115B, 115C can be selectively and dynamically connected with any one or more of the inverters 125 (i.e., inverters 125A, 125B, 125C, 125D, and/or 125E). However, in other embodiments, certain combinations of inverters 125 and motor control algorithms 115A, 115B, 115C may be omitted as being not required or not feasible, which can reduce the number of control switches included in control switching network 120. The power switching network 130 includes sufficient numbers of power switches 225 so that each of the inverters 125 can be selectively and dynamically connected with any one or more of the electrical loads (i.e., motors 140). Similarly, in other embodiments, certain combinations of inverters 125 and electrical loads may be omitted to reduce the number of power switches 225 included in power switching network 130. While fifteen (15) control switches 205 (corresponding to three motor control algorithms 115 and five inverters 125) and fifteen (15) power switches 225 (corresponding to the five inverters 125 and three electrical loads) are depicted, these numbers may vary based on the implementation. For example, the number of paralleled inverters 125 can be more than five, such as any suitable number N. Consequently, the dimension of the control switching network 120 will be 3×N, and the dimension of the power switching network 130 will be N×3. Similarly, the number of motors (or loads) 140 may be more than three, e.g., a number M. Consequently, the dimension of the power switching network will be N×M.

In some embodiments, the modular converter system 100 is divided into a plurality of stages. As shown, the modular converter system 100 includes a controller stage 145 and a power stage 150. The components within the controller stage 145 (e.g., system controller 105, motor control system 110) can be operated within a different power supply regime than the components within power stage 150. For example, the controller stage 145 may be powered at a relatively low voltage (e.g., between about 1 volt (V) and 20 V) that is suitable for operating the controller stage components, while the power stage 150 is powered with relatively higher voltages (e.g., between about 100 V to 1000 V or more) suitable for producing the output power required to drive the loads (such as motors 140). Furthermore, in some embodiments, the power stage 150 is configured to provide a power output having multiple phases (e.g., a three-phase AC output) for driving the loads. In such embodiments, each connection between inverters 125, power switching network 130, and motors 140 may represent a three-phase power connection. By separating the components of the modular converter system 100 into multiple stages, the components of controller stage 145 need not be dimensioned to handle the higher voltages and/or currents of the power stage 150. As a result, the controller stage 145 may generally include smaller and/or less lossy components, reducing the weight and improving the efficiency of the modular converter system 100.

Control and/or feedback signals communicated between the controller stage 145 and power stage 150 may cross an isolation barrier configured to prevent the higher voltages (e.g., large DC voltages) of the power stage 150 from affecting the lower-voltage components of the controller stage 145. As shown, the system controller 105 communicates control signals 107 with the motor control system 110 to select particular motor control algorithms 115. The motor control system 110 provides selected algorithm(s) as motor control signals 117 that are transmitted via selected path(s) within the control switching network 120 and delivered to the inverters 125. The motors 140 provide one or more motor feedback signals 142 to the motor control algorithms 115 for updated control. Some non-limiting examples of motor feedback signals 142 include current, voltage, speed, and position values.

In still other embodiments, the modular converter system 100 can assign loads based on a load priority factor. In other words, if, for example, the number of loads requested by external aircraft systems (i.e., by vehicle controller 102) is larger than can be provided by the modular converter system 100, the modular converter system 100 can assign loads by a load priority factor, with higher-priority loads being powered before lower-priority loads. If the aircraft (through vehicle controller 102) makes a request for a relatively large load, e.g., for lowering a landing gear, the system 100 can temporarily reassign some or all of the inverters 125 to power the motor(s) 140 associated with the landing gear. When the landing gear is down and locked, in turn, the modular converter system 100 can reassign the inverters 125 to their previous loads (or to new existing loads). For example, the cabin fan can be temporarily deactivated in favor of lowering the landing gear, and the cabin fan is restarted when the landing gear is down.

In some embodiments, such as when there are an excess of low-priority loads that collectively exceed the power rating of the modular converter system 100, the modular converter system 100 may power some or all of the loads at a reduced setting. In this manner, all loads are powered, but may operate at a lower speed or capacity. So, for example, the aircraft cabin fans, lighting, and entertainment system may request power at the same time in excess of the modular converter system 100 rating. As a result, the modular converter system 100 can, for example, provide full power to the entertainment system, but slightly reduce cabin fan speeds and lighting intensity to reduce overall power demand.

Figure 3A:
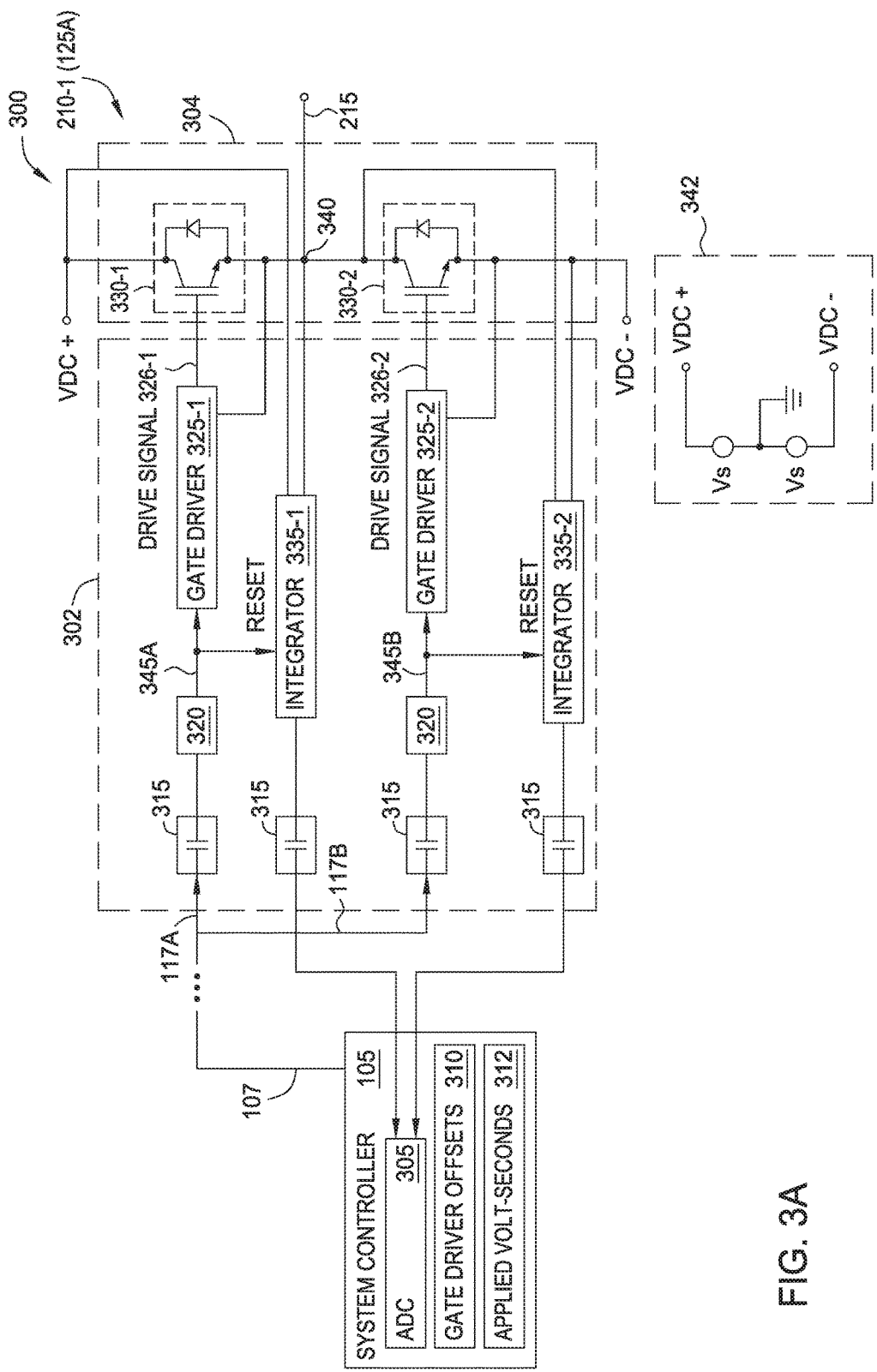
FIG. 3A illustrates an exemplary arrangement of control circuitry within a phase leg of a modular inverter, according to one embodiment.

FIG. 3A illustrates an exemplary arrangement of converter circuitry within a phase leg of a modular inverter, according to one embodiment. In one implementation of a modular converter system (e.g., modular converter system 100, 200 described above), arrangement 300 represents a modular inverter 125 that provides a single-phase power output. In a multi-phase implementation of the modular converter system, the arrangement 300 represents a phase leg 210 of a modular inverter 125 configured to be connected in parallel with phase legs 210 of other inverters 125. While FIG. 3A provides a detailed illustration of sensing and control circuitry 302 relating to a single inverter or a single inverter phase leg 210, the person of ordinary skill will understand that multiple copies of the circuitry may be provided based on the implementation of the modular converter system. Using the example of FIG. 2, each of the five inverters 125A-125E includes three respective phase legs 210-1, 210-2, and 210-3, resulting in a total of fifteen copies of the control circuitry 302 in FIG. 3A. As shown, arrangement 300 includes a plurality of paralleled inverters 125A, 125B which are configured by the power switching network to provide power to a common load. The modular inverter 125 includes control circuitry 302 coupled with the system controller 105 and configured to operate the switches 330-1, 330-2 (also "switching elements" 330) of the inverter 304. The switches 330-1, 330-2 have a phase output node 340 coupled therebetween. The switches 330-1, 330-2 may have any suitable implementation, such as insulated gate bipolar transistors (IGBTs), metal-oxide-semiconductor field-effect transistors (MOSFETs), bipolar junction transistors (BJTs), and so forth. The phase output node 340 carries a power output 215. A power supply 342 provides the power used to generate the power output 215, and inverter 304 controls the waveform of power output 215 according to the switch timing dictated by the drive signals 326-1, 326-2. The power supply 342 provides reference voltages VDC+, VDC− to inverter 304, which as shown correspond to predetermined voltages Vs and −Vs with a ground potential between them. Other configurations of the power supply 342 are possible, such as VDC− at a ground potential.

The switching elements 330-1, 330-2 may be designed to have a predetermined relative switching strength or other relative switching properties, but during operation may behave slightly differently than designed due to manufacturing tolerances, the presence of parasitic elements based on nearby components, and so forth. In other words, the switches 330-1, 330-2 can differ in operation from each other, and/or can differ from the desired result of the drive signals 326-1, 326-2 provided by the gate drivers 325-1, 325-2.

During operation, the system controller 105 provides control signals 107, which are used to select motor control algorithms (not shown; 115A, 115B, 115C of FIGS. 1, 2) to provide motor control signals 117A, 117B, to control circuitry 302 to control the modular inverter 125. To prevent high voltage DC signals from crossing from the modular inverter 125 to the system controller 105, isolation barriers 315 are located along each path for motor control signals 117A, 117B. The isolation barriers 315 may have any suitable implementation for galvanic isolation, such as class X or class Y capacitors. Control circuitry 302 also includes protection logic 320 located between isolation barriers 315 and gate drivers 325-1, 325-2, which may have any suitable implementation for protecting loads during particular operational conditions, such as including short circuit detection logic, overload detection logic, overtemperature detection logic, etc. implemented in hardware and/or software. If any of these operational conditions are detected, the protection logic 320 interrupts the delivery of particular motor control signal(s) 117A and/or 117B to the gate driver(s) 325-1, 325-2 to prevent excessive wear or damage to the connected load. The motor control signals 117A and 117B are provided as respective control signals 345A, 345B to the gate drivers 325-1, 325-2. Based on the control signals 345A, 345B, the gate drivers 325-1, 325-2 generate drive signals 326-1, 326-2 for the switches 330-1, 330-2 to provide a desired waveform of the power output 215. In some embodiments, the power output 215 is provided as a pulse-width modulation (PWM) waveform for driving the load.

Control circuitry 302 includes one or more integrators 335-1, 335-2 that are coupled with phase output node 340 and with a reference voltage. In some embodiments, the integrators 335-1, 335-2 are analog integrators (e.g., an op-amp integrator) configured to provide a continuous sampling of the voltages on phase output node 340. While use of other types of integrators is possible, analog integrators generally provide several advantages over digital integrators. Digital integrators can be more complex and/or expensive to integrate within the arrangement 300. Detecting duty cycle differences between different inverters 125, which can be on the order of a fraction of a percent of the on-time of a switch, requires a large number of samples. For example, suitable sampling of a power output 215 in the tens or hundreds of kilohertz (kHz), which is not uncommon for pulse width modulation (PWM) implementations, can require a sampling frequency well into the megahertz (MHz) range. An analog integrator, by comparison, provides a time-continuous integration of the power output 215 with increased fidelity and resolution. The analog integrator also provides a single analog value across the isolation boundary 315 to the system controller 105, reducing bandwidth requirements.

As shown, integrator 335-1 is connected with phase output node 340 and VDC+, and integrator 335-2 is connected with phase output node 340 and VDC−. Each of the integrators 335-1, 335-2 are configured to integrate over one or more switching cycles of the drive signals 326-1, 326-2, and to transmit the output signal across an isolation barrier 315 to the system controller 105. The system controller 105 includes an analog-to-digital converter (ADC) 305 configured to convert the output signals from integrators 335-1, 335-2 into corresponding discrete values.

The values corresponding to different switches 330 may be compared by the system controller 105 against each other and/or against the desired result of the drive signals 326-1, 326-2 to determine whether the switches 330 are operating as intended or with some error. In some embodiments, the system controller 105 calculates an applied volt-seconds value 312 corresponding to each switch 330-1, 330-2. For example, during a particular switching cycle gate driver 325-1 provides drive signal 326-1 to switch 330-1 that is configured to apply 1000 volts (V) to output node 340 for a one (1) millisecond (ms) duration—a desired applied volt-seconds value of 1.000 V-s. These values are provided for simplistic calculations and may vary based on the implementation of inverters 125 and the power requirements of the connected load. Due to tolerances and/or parasitic elements for the switch 330-1, say the calculated applied volt-seconds value 312 actually applied to switch 330-1 is 1.001 V-s, corresponding to an error of 0.001 V-s.

Figure 3B:
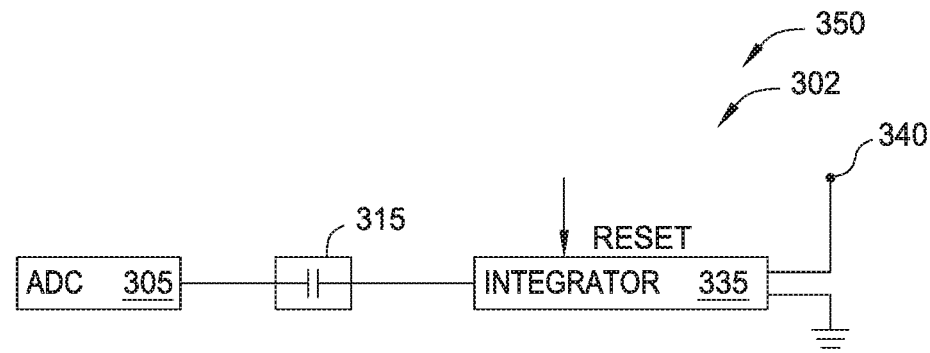
FIGS. 3B and 3C illustrate exemplary arrangements of integrators within control circuitry for a modular inverter, according to one embodiment.
Figure 3C:
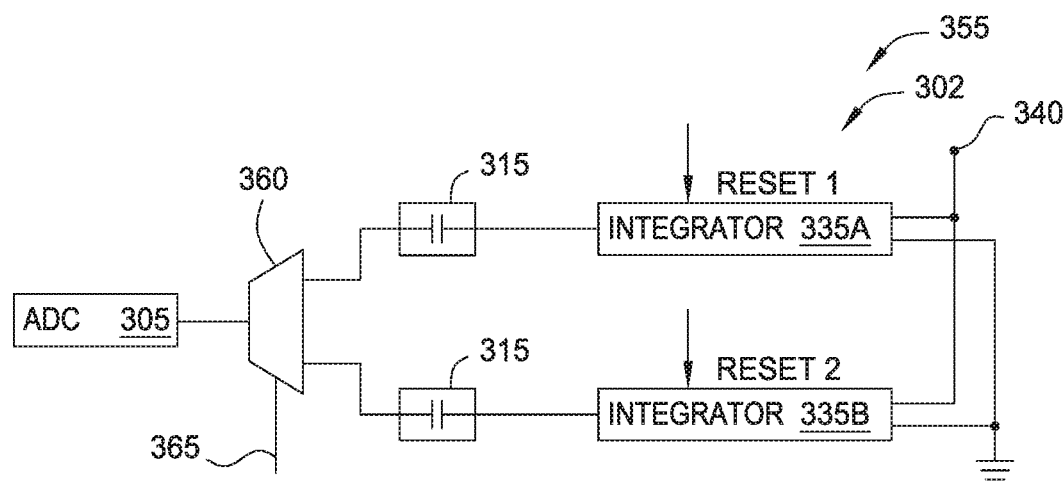

In some embodiments, the system controller 105 is further configured to calculate one or more gate driver offsets 310 based on the determined error. The gate driver offsets 310 may have any suitable form for adjusting the timing (or duty cycle) of the drive signal 326-1. Applying the calculated gate driver offset(s) 310 to gate driver 325-1 adjusts the associated timing of switch 330-1 and reduces or eliminates the error between the desired applied volt-seconds and actual applied volt-seconds values. Thus, in the current example, the system controller applies a gate driver offset 310 to control signals 107, which in turn affects control signal 345A and causes switch 330-1 to reduce its duty cycle so that the calculated applied volt-seconds value 312 actually applied to switch 330-1 is the desired 1.000 V-s, FIGS. 3B and 3C illustrate exemplary alternate arrangements of integrators within a modular converter system. As described above, the arrangement 300 of FIG. 3A depicts inverter 125 as including a first integrator 335-1 connected with phase output node 340 and a first voltage rail (VDC+), and a second integrator 335-2 connected with phase output node 340 and a second voltage rail (VDC−). Arrangement 350 (FIG. 3B) includes a single integrator 335 for the inverter 125, and the integrator 335 is configured to measure voltages on phase output node 340 that are referenced to a ground potential.

Arrangement 355 (FIG. 3C) includes multiple integrators 335A, 335B configured to measure voltages on phase output node 340 that are referenced to a ground potential. The measurements of integrators 335A, 335B may be selectively provided to the ADC 305 using a switching arrangement such as a multiplexer 360. The select signal 365 may be provided by the system controller 105 (not shown). In some embodiments, measurements may be provided in an alternating pattern from the integrators 335A, 335B to provide increased accuracy.

As discussed above, each of the integrators 335-1, 335-2 is configured to integrate over one or more switching cycles of the drive signals 326-1, 326-2. The measurements performed by the integrators 335-1, 335-2 may be periodically reset using a reset signal provided to the integrators 335-1, 335-2. In some embodiments, control signals 345A, 345B to the gate drivers 325-1, 325-2 can provide a suitable reset signal. For example, a rising edge of control signals 345A, 345B can indicate the completion of a particular switching cycle and may be used to trigger a reset of the integrators 335-1, 335-2. In other embodiments, the system controller 105 may generate a distinct reset signal (not shown) for the integrators 335-1, 335-2.

Resetting the integrators 335-1, 335-2 is generally not an instantaneous event. In the example of analog integrators comprising a feedback capacitor, resetting the integrator may comprise closing a switch to cause discharge of the feedback capacitor according to an associated time constant. Therefore, during some time periods the integrators 335-1, 335-2 are not integrating voltage values of the phase output node 340, which can have effects on resulting measurements.

Arrangement 355 (FIG. 3C) provides one means for improving measurement accuracy. During a reset of a first integrator 335A controlled by a first reset signal (i.e., RESET 1), the ADC 305 receives measurements from the second, non-resetting integrator 335B to more completely capture the voltage values of the phase output node 340. During a reset of the second integrator 335B controlled by second reset signal (i.e., RESET 2), the ADC 305 receives measurements from the first, non-resetting integrator 335A. The select signal 365 controlling the multiplexer 360 may be a separate signal provided from the system controller 105 (not shown) or may be based on a logic combination of the first and/or second reset signals.

Other techniques for adjusting measurements to compensate for reset periods are also possible. For example, the system controller 105 (not shown) may perform a mathematical extrapolation for measurement(s) of ADC 305 corresponding to reset periods. This approach may be feasible where electromagnetic interference (EMI) cross-talk, such as noise introduced by other switching elements of the arrangement 300, 350, 355, is controlled relatively well.

While the various arrangements 300, 350, 355 were specifically discussed with respect to a single-phase power output 215, the person of ordinary skill will understand that the techniques may be applied to multiple-phase inverter modules (e.g., corresponding to driving a multiple-phase load) and may be applied across the operation of two or more modular inverters.

Other implementations of the arrangements 300, 350, 355 are possible. In one alternate embodiment, the system controller 105 and ADC 305 are located on the "power side" of the isolation boundary 315 (i.e., with the gate drivers 325-1, 325-2 and the switches 330-1, 330-2). Such an implementation would generally require an increased bandwidth across the isolation boundary 315, as the system controller 105 may still be required to communicate with an external vehicle controller and/or other control elements in a different power supply regime. In another alternate embodiment, fast control loops may be provided between the gate drivers 325-1, 325-2 and the voltage measurements taken at the phase output node 340A, which in some cases may be used to implement the gate driver offsets 310 instead of the system controller 105. In other cases, the system controller 105 provides the gate driver offsets 310 and the fast control loops provide adjustments to the drive signals 326-1, 326-2 that are relatively small compared to the gate driver offsets 310.

Figure 3D:
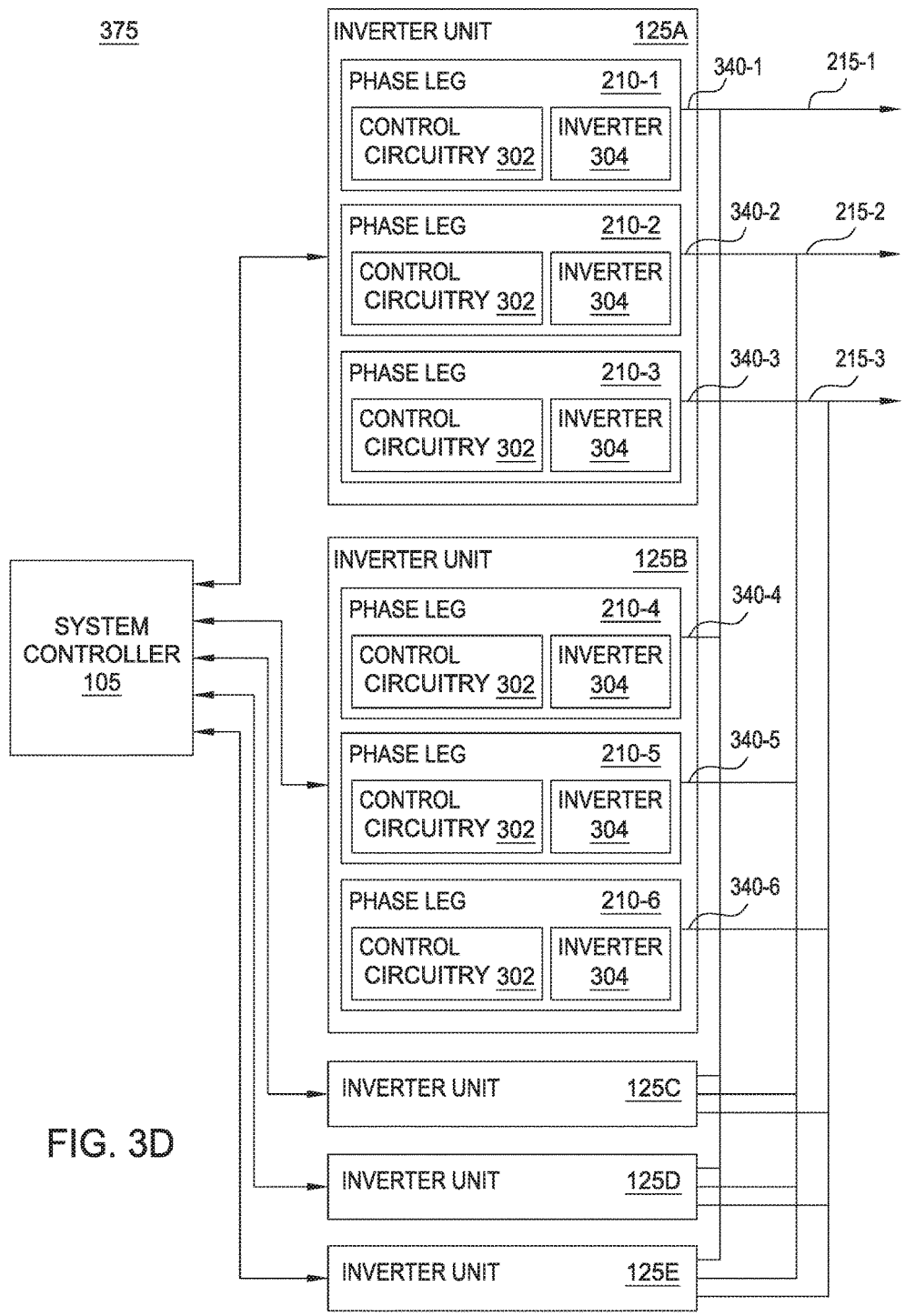
FIG. 3D illustrates an exemplary arrangement of a plurality of inverters within a multi-phase modular converter system, according to one embodiment.

FIG. 3D illustrates an exemplary arrangement 375 of a plurality of inverters within a multi-phase modular converter system, according to one embodiment. More specifically, arrangement 375 illustrates that similar techniques to those discussed above for adjusting operation of gate drivers for modular inverters may be used to balance current production between inverter modules of a multi-phase modular converter system.

Inverter units 125A and 125B are similarly configured, each having three phase legs with three phase output nodes 340. Although not explicitly shown, assume that inverter units 125C-125E are also similarly configured for three-phase operation. As shown, phase output nodes 340-1 and 340-4 are coupled together (as well as with phase output nodes of inverter units 125C-125E) to produce a power output 215-1 having a first phase. In other words, the phase leg 210-1 and 210-4 are connected in parallel. Phase output nodes 340-2 and 340-5 are coupled together (again, with phase output nodes of inverter units 125C-125E) to produce power output 215-2 having a second phase. Phase output nodes 340-3 and 340-6 are coupled together (again, with phase output nodes of inverter units 125C-125E) to produce power output 215-3 having a third phase.

However, even in embodiments where the inverter units 125A-125E share a same implementation, each of the inverters 304 of the inverter units 125A-125E may behave slightly differently during operation due to manufacturing tolerances, the presence of parasitic elements based on nearby components, and so forth. The inverters 304 can differ in operation from each other, and/or can differ from the desired result of the drive signals provided to the inverters 304 by control circuitry 302.

To mitigate these differences, the control circuitry 302 included in each phase leg 210 samples voltages on the corresponding phase output node 340, and communicates these voltages with the system controller 105. The system controller 105 may calculate applied volt-seconds values for each of the phase output nodes 340, which may then be compared to determine whether any of the inverters 125A-125E have uneven loading. The system controller 105 may also generate one or more gate driver offsets to control subsequent operation of the inverters 304 to mitigate any uneven loading and/or error between desired applied volt-seconds values and the values actually applied by the inverters 304.

Using a previous example, say that the system controller 105 sends control signals to paralleled phase legs 210-1, 210-4 that are configured to cause corresponding inverters 304 to apply 1000 V to output nodes 340-1, 340-4 for a 1 ms duration (i.e., a desired value of 1.000 V-s). Due to tolerances and/or parasitic elements for the inverters 304, say the applied volt-seconds values calculated by the system controller 105 are 1.001 V-s to phase leg 210-1 and 0.999 V-s to phase leg 210-4.

In one embodiment, the system controller 105 applies a calculated gate driver offset to phase leg 210-1 to reduce the duty cycle of the corresponding inverter to match the 0.999 V-s value for phase leg 210-4. As one alternative, the system controller 105 applies a calculated gate driver offset to phase leg 210-4 to apply the 1000V for a longer period and match the 1.001 V-s value for phase leg 210-1. As another alternative, the system controller 105 applies gate driver offsets to both phase legs 210-1, 210-4 to balance the output from the inverters and to correct the differences between the calculated applied volt-seconds values (i.e., 1.001 V-s, 0.999 V-s) and the desired result of the drive signals (i.e., 1.000 V-s).

Figure 4:
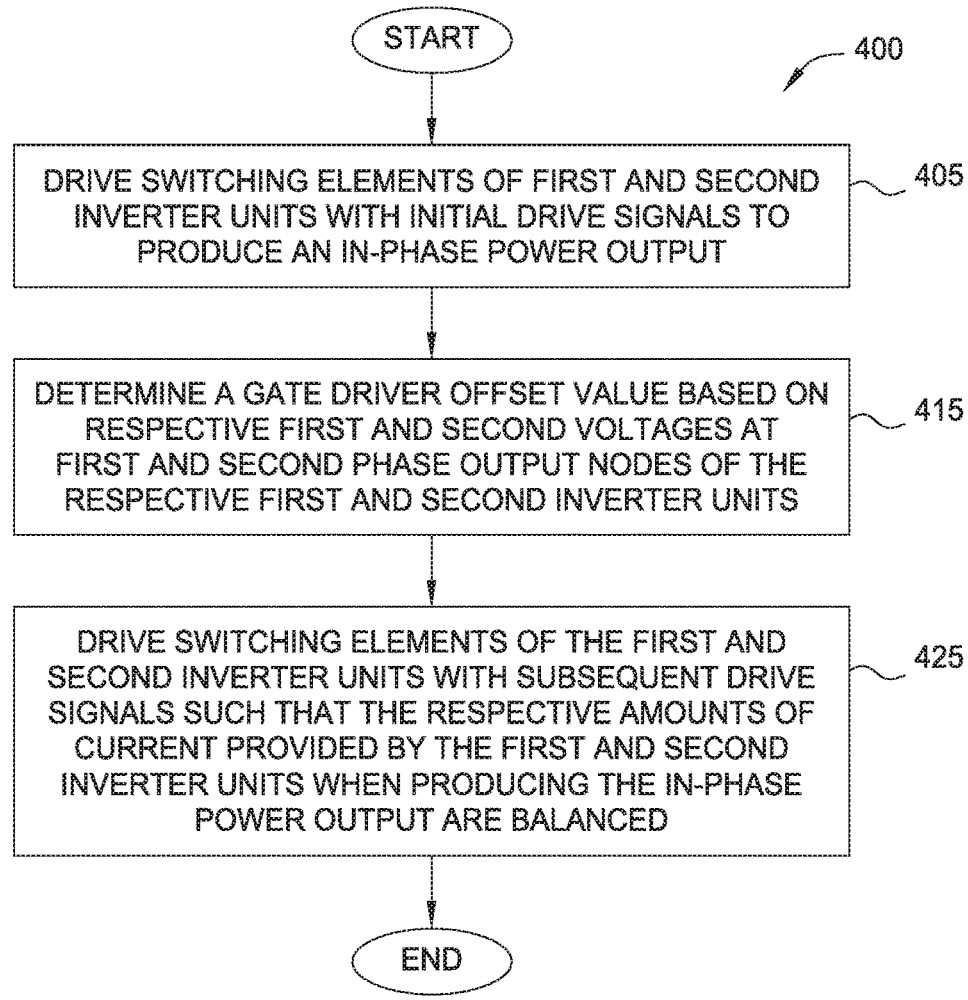
FIG. 4 illustrates a method of controlling power output of a modular converter system comprising a plurality of parallel inverter units, according to one embodiment.

FIG. 4 illustrates a method of controlling power output of a modular converter system comprising a plurality of parallel inverter units, according to one embodiment. Generally, method 400 may be performed consistent with any of the embodiments of modular converter system 100, 200 and arrangements 300, 350, 355, 375 discussed above.

Method 400 begins at block 405, where switching elements of first and second inverter units are driven with initial drive signals to produce an in-phase power output. The first and second inverter units may each include different phase legs that are paralleled together using a power switching network. Driving the signals may be performed by gate drivers of the first and second inverter units. In some embodiments, the initial drive signals for the first inverter unit and the second inverter unit are the same, but this is not a requirement.

At block 415, a gate driver offset value is determined based on respective first and second voltages at first and second phase output nodes of the respective first and second inverter units. Determining the gate driver offset value may be determined by a system controller coupled with the first and second inverter units, or alternately by one or more local fast control loops coupled with the gate drivers and the phase output nodes.

In some embodiments, determining the gate driver offset value comprises integrating, using at least one integrator coupled with each of the first and second phase output nodes, each of the first and second voltages relative to at least one reference voltage. In some embodiments, determining the gate driver offset value comprises calculating, for each of the first and second inverter units, a respective applied volt-seconds value. The gate driver offset value is based on a difference between the respective calculated applied volt-seconds values, which indicates an imbalance of the loading between the first and second inverter units. The gate driver offset value may be further based on a difference between the calculated applied volt-seconds values and the desired result of the drive signals.

At block 425, the switching elements of the first and second inverter units are driven with subsequent drive signals, such that the respective amounts of current provided by the first and second inverter units when producing the in-phase power output are balanced. The subsequent drive signals for one or both of the first and second inverter units may be adjusted using the determined gate driver offset value. The subsequent drive signals may also cause the first and second inverter units to produce the desired result of the drive signals. Method 400 ends following completion of block 425.

Figure 5:
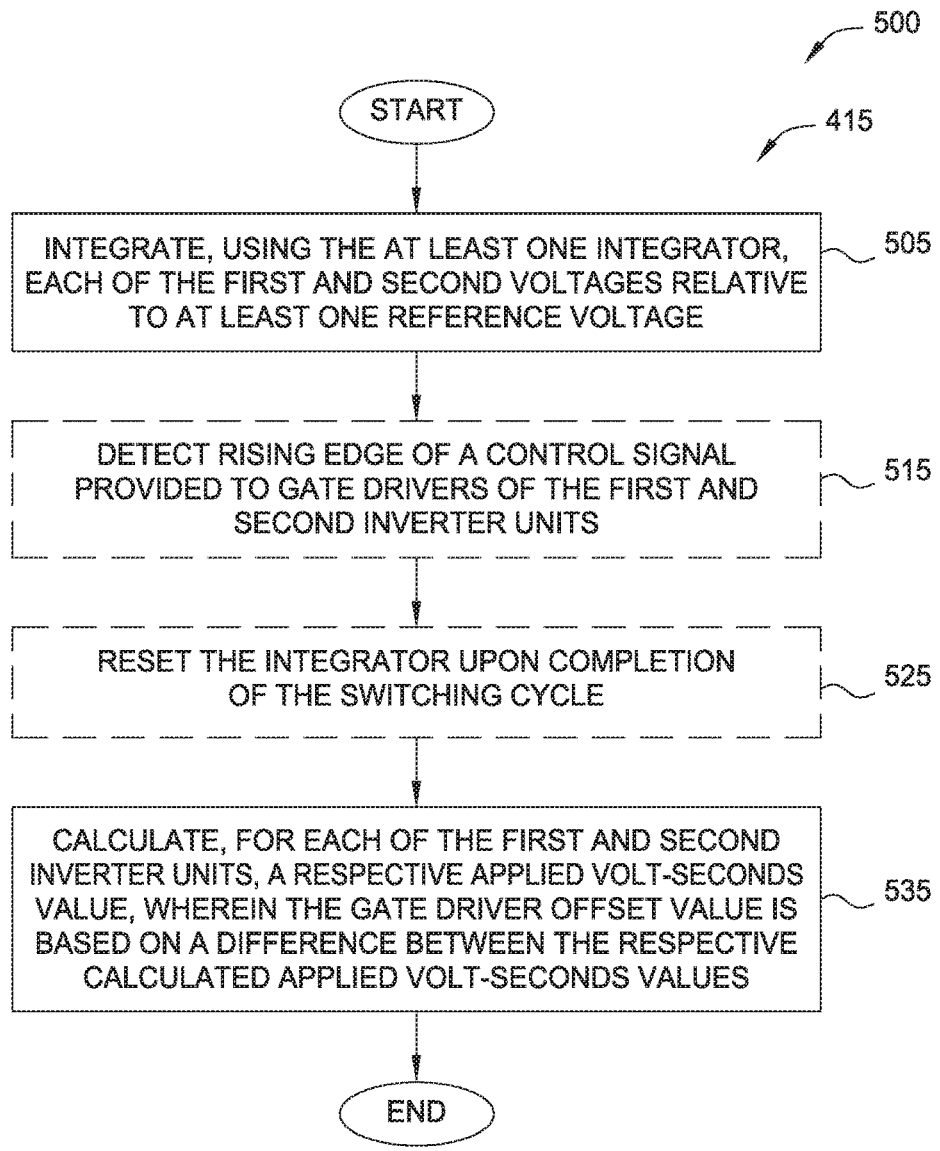
FIGS. 5 and 6 illustrate methods of determining a gate driver offset value, according to one embodiment.
Figure 6:
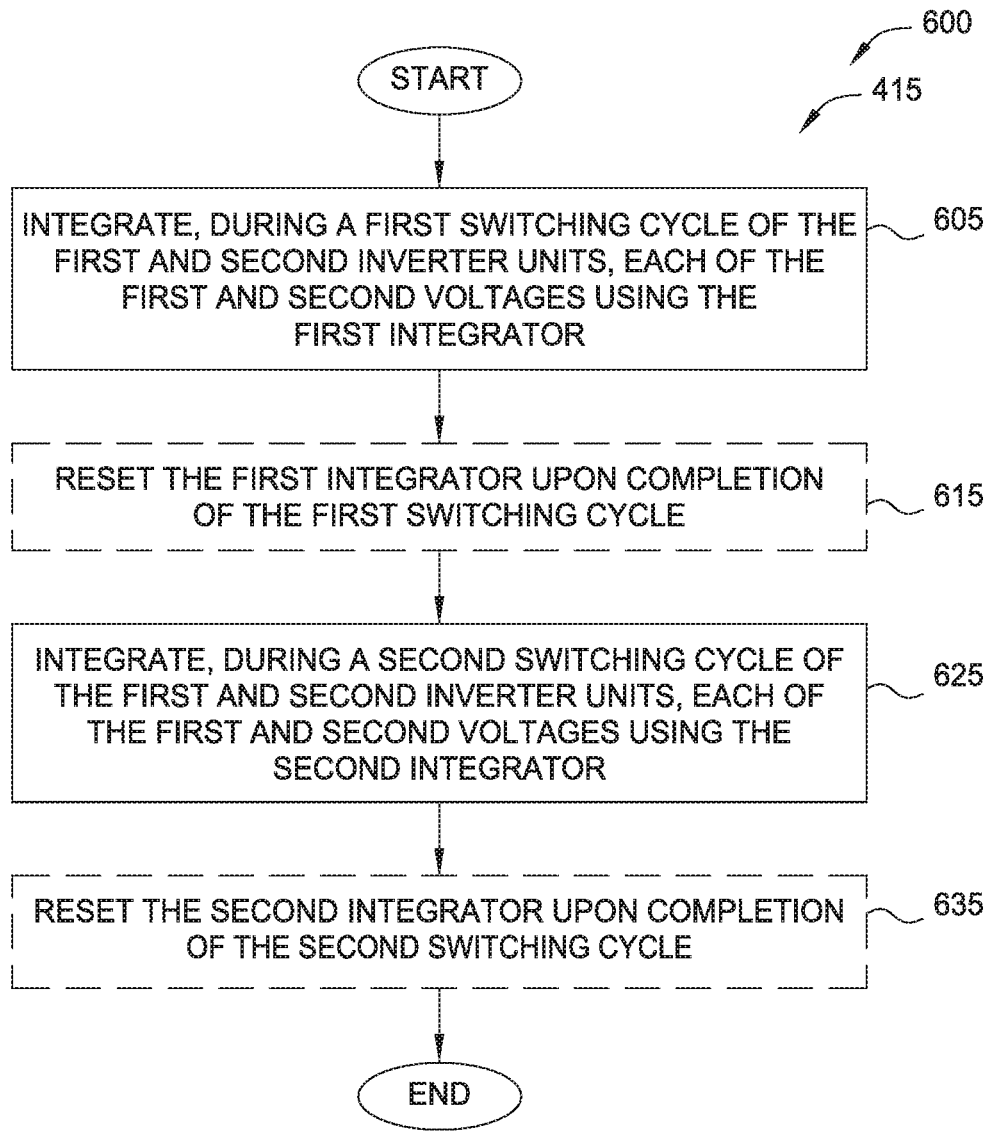

FIGS. 5 and 6 illustrate methods of determining a gate driver offset value, according to one embodiment. Each of methods 500 and 600 represent a possible implementation of block 415 of method 400, in which a gate driver offset value is determined based on respective first and second voltages at first and second phase output nodes of respective first and second inverter units.

Method 500 begins at block 505, where the at least one integrator coupled with the first and second phase output nodes integrates each of the first and second voltages relative to at least one reference voltage. The reference voltages may be voltage rails configured to power the inverter units. At optional blocks 515 and 525, a rising edge is detected for a control signal provided to gate drivers of the first and second inverter units. The integrator is reset upon completion of the switching cycle, which is indicated by the detected rising edge. In alternate embodiments, a falling edge of the control signal may be used, or a separate control signal configured to reset the integrator. At block 535, the system controller calculates, for each of the first and second inverter units, a respective applied volt-seconds values. The gate driver offset values is based on a difference between the respective calculated applied volt-seconds values. Method 500 ends following completion of block 505.

Method 600 generally applies to an implementation having multiple integrators connected with a particular phase output node, such as shown in FIG. 3C. For example, the phase output node of the first inverter unit may have a first pair of integrators, and the phase output node of the second inverter unit may have a second pair of integrators. Method 600 begins at block 605, where during a first switching cycle of the first and second inverter units, a first integrator integrates each of the first and second voltages. At optional block 615, the first integrator is reset upon completion of the first switching cycle, e.g., based on a detected rising or falling edge of a control signal. At block 625, during a second switching cycle of the first and second inverter units, a second integrator integrates each of the first and second voltages. Blocks 615 and 625 may be at least partly overlapping in time, such that measurement of the voltages can be substantially continuous despite the occasional resetting of the first integrator. At optional block 635, the second integrator is reset upon completion of the second switching cycle. Method 600 ends following completion of block 635. In an alternate embodiment, method 600 repeats, returning from block 635 to block 605. In this case, blocks 635 and 605 may be at least partly overlapping in time.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of controlling power output of a modular converter system comprising a plurality of parallel inverter units, the plurality of parallel inverter units comprising a first inverter unit with at least a first phase output node and a second inverter unit with at least a second phase output node, the method comprising:
  driving switching elements of the first and second inverter units with initial drive signals to produce an in-phase power output;
  determining a gate driver offset value based on respective first and second voltages at the first and second phase output nodes, wherein determining the gate driver offset value comprises:
    calculating, for each of the first and second inverter units, a respective applied volt-seconds value, wherein the gate driver offset value is based on a difference between the respective calculated applied volt-seconds values; and
  driving, based on the determined gate driver offset value, the switching elements of the first and second inverter units with subsequent drive signals such that respective amounts of current provided by the first and second inverter units when producing the in-phase power output are balanced.

2. A method of controlling power output of a modular converter system comprising a plurality of parallel inverter units, the plurality of parallel inverter units comprising a first inverter unit with at least a first phase output node and a second inverter unit with at least a second phase output node, wherein each of the first and second phase output nodes are coupled with at least one integrator of the modular converter system, the method comprising:
  driving switching elements of the first and second inverter units with initial drive signals to produce an in-phase power output;
  determining a gate driver offset value based on respective first and second voltages at the first and second phase output nodes, wherein determining the gate driver offset value comprises:
    integrating, using the at least one integrator, each of the first and second voltages relative to at least one reference voltage; and
  driving, based on the determined gate driver offset value, the switching elements of the first and second inverter units with subsequent drive signals such that respective amounts of current provided by the first and second inverter units when producing the in-phase power output are balanced.

3. The method of claim 2, wherein the at least one reference voltage comprises a system ground.

4. The method of claim 2, wherein integrating each of the first and second voltages occurs during a switching cycle of the first and second inverter units, the method further comprising:
  resetting the at least one integrator upon completion of the switching cycle.

5. The method of claim 4, wherein resetting the at least one integrator occurs upon detecting a rising edge of a control signal provided to gate drivers of the first and second inverter units.

6. The method of claim 2, wherein the at least one integrator comprises first and second integrators, the method further comprising:
  integrating, during a first switching cycle of the first and second inverter units, each of the first and second voltages using the first integrator; and
  integrating, during a second switching cycle of the first and second inverter units, each of the first and second voltages using the second integrator.

7. The method of claim 1, wherein the gate driver offset value is further based on a difference between the calculated applied volt-seconds values and desired outputs of the first and second inverter units when driven with the initial drive signals.

8. A modular converter system, comprising:
  a system controller; and
  at least first and second inverter units connected in parallel and configured to produce an in-phase power output, each inverter unit of the first and second inverter units respectively comprising:
    a pair of switching elements having a phase output node coupled therebetween, and
    a pair of gate drivers, each gate driver configured to receive a respective control signal from the system controller and to generate a drive signal to control switching of a respective one of the pair of switching elements, wherein the system controller is configured to:
  calculate, for each of the first and second inverter units, a respective applied volt-seconds value,
  determine a gate driver offset value based on respective voltages at the phase output nodes of the first and second inverter units, wherein the gate driver offset value is based on a difference between the respective calculated applied volt-seconds values, and
  control, based on the determined gate driver offset value, the gate drivers to drive the first and second inverter units with subsequent drive signals such that amounts of current provided by the first and second inverter units when producing the in-phase power output are balanced.

9. A modular converter system comprising:
a system controller;
at least first and second inverter units connected in parallel and configured to produce an in-phase power output, each inverter unit of the first and second inverter units respectively comprising:
  a pair of switching elements having a phase output node coupled therebetween, and
  a pair of gate drivers, each gate driver configured to receive a respective control signal from the system controller and to generate a drive signal to control switching of a respective one of the pair of switching elements;
one or more first integrators coupled with the phase output node of the first inverter unit; and
one or more second integrators coupled with the phase output node of the second inverter unit,
wherein the system controller is configured to:
  determine a gate driver offset value based on respective voltages at the phase output nodes of the first and second inverter units, wherein determining the gate driver offset value comprises:
    integrating, using the one or more first integrators and the one or more second integrators, each of the first and second voltages relative to at least one reference voltage; and
  control, based on the determined gate driver offset value, the gate drivers to drive the first and second inverter units with subsequent drive signals such that amounts of current provided by the first and second inverter units when producing the in-phase power output are balanced.

10. The modular converter system of claim 9, wherein the at least one reference voltage comprises a system ground.

11. The modular converter system of claim 9, wherein integrating each of the first and second voltages occurs during a switching cycle of the first and second inverter units,
wherein the system controller is further configured to reset the one or more first integrators and the one or more second integrators upon completion of the switching cycle.

12. The modular converter system of claim 11, wherein resetting the one or more first integrators and the one or more second integrators occurs upon detecting a rising edge of a control signal provided to the pair of gate drivers of each of the first and second inverter units.

13. The modular converter system of claim 9, wherein the one or more first integrators comprise a first plurality of integrators and the one or more second integrators comprise a second plurality of integrators,
  wherein at least one integrator of each of the first plurality and the second plurality of integrators is configured to integrate the respective first and second voltages during a first switching cycle of the first and second inverter units, and
  wherein at least another integrator of each of the first plurality and the second plurality of integrators is configured to integrate the respective first and second voltages during a second switching cycle of the first and second inverter units.

14. The modular converter system of claim 8, wherein the gate driver offset value is further based on a difference between the calculated applied volt-seconds values and desired outputs of the first and second inverter units when driven with the initial drive signals.

15. A non-transitory computer-readable medium comprising computer program code that, when executed by operation of one or more computer processors, performs an operation of controlling power output of a modular converter system comprising a plurality of parallel inverter units,
  the plurality of parallel inverter units comprising a first inverter unit with at least a first phase output node and a second inverter unit with at least a second phase output node,
  the operation comprising:
    communicating with a plurality of gate drivers to drive switching elements of the first and second inverter units with initial drive signals to produce an in-phase power output;
    determining a gate driver offset value based on respective first and second voltages at the first and second phase output nodes, wherein determining the gate driver offset value comprises:
      calculating, for each of the first and second inverter units, a respective applied volt-seconds value, wherein the gate driver offset value is based on a difference between the respective calculated applied volt-seconds values; and
    communicating with the plurality of gate drivers to drive, based on the determined gate driver offset value, the switching elements of the first and second inverter units with subsequent drive signals such that respective amounts of current provided by the first and second inverter units when producing the in-phase power output are balanced.

16. A non-transitory computer-readable medium comprising computer program code that, when executed by operation of one or more computer processors, performs an operation of controlling power output of a modular converter system comprising a plurality of parallel inverter units,
  the plurality of parallel inverter units comprising a first inverter unit with at least a first phase output node and a second inverter unit with at least a second phase output node, wherein each of the first and second phase output nodes are coupled with at least one integrator of the modular converter system,
  the operation comprising:
    communicating with a plurality of gate drivers to drive switching elements of the first and second inverter units with initial drive signals to produce an in-phase power output;

determining a gate driver offset value based on respective first and second voltages at the first and second phase output nodes, wherein determining the gate driver offset value comprises:
    integrating, using the at least one integrator, each of the first and second voltages relative to at least one reference voltage; and
communicating with the plurality of gate drivers to drive, based on the determined gate driver offset value, the switching elements of the first and second inverter units with subsequent drive signals such that respective amounts of current provided by the first and second inverter units when producing the in-phase power output are balanced.

17. The non-transitory computer-readable medium of claim 16, wherein integrating each of the first and second voltages occurs during a switching cycle of the first and second inverter units, the operation further comprising:
    resetting the integrator upon completion of the switching cycle.

18. The non-transitory computer-readable medium of claim 17, wherein resetting of the integrator occurs upon detecting a rising edge of a control signal provided to gate drivers of the first and second inverter units.

19. The non-transitory computer-readable medium of claim 16, wherein the at least one integrator comprises first and second integrators, the operation further comprising:
    integrating, during a first switching cycle of the first and second inverter units, each of the first and second voltages using the first integrator; and
    integrating, during a second switching cycle of the first and second inverter units, each of the first and second voltages using the second integrator.

20. The non-transitory computer-readable medium of claim 15, wherein the gate driver offset value is further based on a difference between the calculated applied volt-seconds values and desired outputs of the first and second inverter units when driven with the initial drive signals.

\* \* \* \* \*

UNITED STATES PATENT AND TRADEMARK OFFICE
CERTIFICATE OF CORRECTION

PATENT NO. : 9,991,778 B2  
APPLICATION NO. : 15/055828  
DATED : June 5, 2018  
INVENTOR(S) : Matthew J. Krolak et al.

Page 1 of 1

It is certified that error appears in the above-identified patent and that said Letters Patent is hereby corrected as shown below:

On the Title Page

Under "(*) Notice", in Column 1, Line 3, after "0 days." delete "days.".

In item (56), in Column 2, under "Other Publications", Line 1, delete "International Business Machines" and insert -- The Boeing Company --, therefor.

In the Specification

In Column 1, Line 10, delete "Architecture "." and insert -- Architecture". --, therefor.

In the Claims

In Column 16, Line 58, in Claim 8, delete "system," and insert -- system --, therefor.

Signed and Sealed this  
Seventh Day of August, 2018

Andrei Iancu  
*Director of the United States Patent and Trademark Office*